United States Patent [19]

Fujii

[11] Patent Number: 5,092,441
[45] Date of Patent: Mar. 3, 1992

[54] MANUALLY RESTORABLE OVERLOAD CLUTCH

[75] Inventor: Shunji Fujii, Osaka, Japan

[73] Assignee: Tsubakimoto Emerson Co., Osaka, Japan

[21] Appl. No.: 590,656

[22] Filed: Sep. 28, 1990

[30] Foreign Application Priority Data

Sep. 30, 1989 [JP] Japan .................................. 1-253790

[51] Int. Cl.⁵ .............................................. F16D 43/20
[52] U.S. Cl. ................................. 192/56 R; 192/114 R
[58] Field of Search .................... 192/56 R, 114 R; 464/36

[56] References Cited

U.S. PATENT DOCUMENTS 3,203,523  8/1965  Gilder et al. ................ 192/56 R
4,543,074  9/1985  Ville et al. ................ 192/56 R X
4,668,206  5/1987  Fukumoto ................... 192/56 R X

FOREIGN PATENT DOCUMENTS 0881416  11/1981  U.S.S.R. .................... 464/36

Primary Examiner—Rodney H. Bonck
Attorney, Agent, or Firm—Flynn, Thiel, Boutell & Tanis

[57] ABSTRACT

In an overload clutch for shutting off torque transmission when an overload is encountered in an driven part, a pressure member is formed with a tapered surface so that a ball may be held by the tapered surface, the outer surface of the driving member and the end surface of a ring member axially urged by a spring while torque is transmitted. An annular groove is formed on the outer surface of the driving member such that the ball falls into the groove when torque transmission is shut off due to an overload such that the urging force will not act on the pressure member. Restoration to the torque-transmitting operation may be effected by moving the pressure member in the reverse direction.

6 Claims, 8 Drawing Sheets

MANUALLY RESTORABLE OVERLOAD CLUTCH

FIELD OF THE INVENTION

This invention relates to an overload clutch in which transmission of torque may be shut off when an overload is encountered in a driven part and this invention especially relates to an overload clutch in which the condition of torque transmission shut-off may be retained unless a restoring operation is made manually and deliberately, once transmission of torque is shut off due to an overload.

BACKGROUND OF THE INVENTION

Conventionally, ball clutches and roller clutches have been provided as a safety device between a driving part and a driven part of a torque transmission mechanism so that the driving part may rotate idly when an overload is encountered in the driven part. Thus, possible damage to the transmission may be avoided. The value of the transmitted torque when the torque shut-off takes place is generally called "tripping torque".

Typically in such an overload clutch, as shown in FIG. 8, torque transmitting elements 212 are held within hollow portions 224 formed in the driven plate 230 and are urged by means of the pressure plate 240 toward the recesses 232 formed in the hub 220 so as to effect torque transmission. The urging force is imparted by a spring 215. When an overload is encountered, the torque transmissing elements 212 escape from the recesses 232 in opposition to the urging force so as to shut off torque transmission.

The device shown in FIG. 8 is a so-called "automatic return type" in which the torque transmitting elements 212 which have escapted from the recesses 232 due to the overload condition, are adapted to automatically re-engage with the recesses 232 so as to resume the torque transmission once the causes of the overload are removed, since the torque transmitting elements are urged by the pressure plate 240 at all times.

However, in cases where the causes for an overload continue to exist relatively long, or limited rotations are unavoidable due to inertia of the driving or driven parts, the torque transmitting elements 212 must collide with the edges of the recessess 232, thereby causing shock or heat generation to the driving or driven parts. Also, due to such collisions, the edges of the recesses 232 are likely to be damaged, thereby causing fluctuations in the value of the tripping torque.

That is the reason why there is a need for a manually restorable overload clutch. The "manually restorable overload clutch" refers to an overload clutch in which the condition of torque transmission shut-off may be retained unless a manual and deliberate restoring operation is effected, once transmission of torque is shut off due to an overload.

Japanese Utility Medel Laid-open Application No. 132918/1984 discloses an example of such a manually restorable overload clutch, which is constructed as shown in FIG. 9 and has the following drawbacks:

1. Since the force urging the torque transmitting elements 312 toward the recesses 332 by means of the spring 315 is given by way of the tapered surfaces 301, 302 and 303, control of the tripping torque is rather difficult requiring accurate machining of those surfaces including their inclinations.

2. When the torque transmitting elements 312 escape from the recesses 332 and the ball 317 separates from the pressure plate 340, the ball 317 moves inwardly rolling on the tapered surface 303. When the ball 317 reaches the edge of the tapered surface 303, a force along the normal thereof acts on the ball 317. This force tends to force the ball 317 out of the moving path of the pressure plate 340 and increases by degrees. Thus, the torque shut-off takes place just when the ball 317 reaches the edge. Namely, not only the angles of the tapered surfaces, but the length of the slope is also important for determining the conditions of torque shut-off. By nearing the inclination of the tapered surface 303 to 90 degrees relative to the shaft and by nearing the inclination of the tapered surface 302 of the inner ring 311 to zero, it will be possible to decrease the amount of rolling travel of the ball 317 relative to the amount of movement of the torque transmitting elemens 312. However, in this case, a relatively large amount of travel of the pressure plate 340 will be required from the time when the ball 317 arrives at the edge until the time when it is forced out of the path of the pressure plate 340. Therefore, it will be practically difficult to realize a manually restorable overload clutch on the basis of the principle of the above prior art.

3. Since the urging force of the spring 315 also acts on the tapered surface 302 of the inner ring 311, a larger sized spring will be required as the inclination of the tapered surface 302 nears 90 degrees. As illustrated in FIG. 10a, the forces acting on the ball 317 comprises the spring force P11, the reaction force P21 of the pressure plate 340 and the reaction force P32 of the inner ring 311. The relationship between the axial and radial components of those forces may be represented as follows:

Axial components: $P12 = P22 + P32$

Radial components: $P23 = P13 + P33$

As regards the axial components, the force by which the pressure plate 340 presses the ball 317 is smaller than the axial component force P12 of the spring 315. Consequently, it is unavoidable that a relatively large-sized spring is needed in case of the overload clutch illustrated.

In order to cope with the problem mentioned in the above point 2, the inclination of the tapered surface 302 of the inner ring 311 must be increased; however, the problem in the above point 3 calls it to be small, which are contradictory with each other.

4. FIG. 10b shows the various forces acting on the ball when the torque transmission has been shut off. In this case, there are the spring force P14, the reaction force P24 of the pressure plate 340 and the reaction force P34 of the inner ring 311. The relationship between the axial and radial components of those forces may be represented as follows:

Axial components: $P15 = P35$

Radial components: $P24 = P16 + p36$

Given $\mu$ as the coefficient of friction regarding the friction of the ball 317 on the surface of the pressure plate 340, the force F required to restore the pressure 340 so as to transmit torque will be represented as follows:

$F = \mu \, P24$ $$F = \mu \, (P16 + P36)$$

The force required for restoration is generated by the two tapered surfaces 301, 302 and as mentioned in the point 3 above, the spring must unavoidably be large, and consequently, P24 must also be large. As a result, the value of the force F becomes large rendering the restoration rather difficult.

5. Such an overload clutch 300 requires a large number of parts; and machining of the tapered surfaces 301, 302 and 303 is difficult.

6. In case of maintenance, the balls 317 fall off when the device is disassembled. Assemblage incorporating the balls 317 is also troublesome.

The object of the present invention therefore is to provide an overload clutch which is capable of solving the above-mentioned problems enabling accurate setting of tripping torque with a simple structure.

SUMMARY OF INVENTION

The present invention provides an overload clutch in which torque transmitting elements are held within hollow portions formed in one of a driving member or a driven member and are urged by a pressure member through a spring against recesses formed in the other of the driving member or driven member so that torque may be transmitted; and the torque transmitting elements are adapted to escapte from said recesses in opposition to an urging force when an overload is encountered, characterized in that said pressure member is formed with a tapered surface so that a ball may be held by said tapered surface, the outer surface of said driving member and the end surface of a ring member axially urged by said spring while torque is transmitted, and further characterized in that an annular groove is formed on the outer surface of said driving member such that said ball falls into said groove when torque transmission is shut off due to an overload such that said urging force will not act on said pressure member.

When torque is transmitted, the torque transmitting elements are engaged with the recesses as they are urged against thereto by means of the spring, the ring member, the ball and the pressure member. Thus, the driving member and the driven member rotate together and a torque below the prescribed value is transmitted.

When an overload is encountered in the driven member, the torque transmitting elements will urge the pressure member so that the spring may be compressed through the ball and the ring member. As result of the escaping action of the torque transmitting elements, the pressure plate, the ball and the ring member are moved axially. Here, the ball, subject to the radial component force given by the tapered surface of the pressure member, falls into the annular groove formed on the outer surface of the driving member during said axial movement.

When this takes place, the axial urging force to the pressure member ceases to exist. Namely, although the urging force of the spring continues to act on the ring member and the ball, only the radial, outward force acts on the pressure member, as the ball is driven away from the moving path of the pressure member. Thus, there will be no opposing force against the torque transmitting elements escaping from the recesses, thereby enabling a further axial movement of the pressure member. The annular groove will absorb the axial urging force imparted to the ball by the spring. Therefore, once an overload is encountered, the condition of shutoff of torque transmission may be maintained.

In order to restore the clutch to the torque transmitting condition, the pressure member is manually moved in the reverse axial direction after matching the phase of the torque transmitting elements and the recesses. The configuration of the annular groove is such that the ball may escape therefrom by the urging force of the spring, e.g., a V-shaped groove whose depth is smaller than the diameter of the ball. Accordingly, as the pressure member is restored to the original position, the ball escaptes from the annular groove so as to abut against the tapered surface of the pressure member once again receiving the urging force of the spring thereby transmitting torque. In this manner, the torque transmitting condition may be restored.

EMBODIMENTS

Figure 1A:
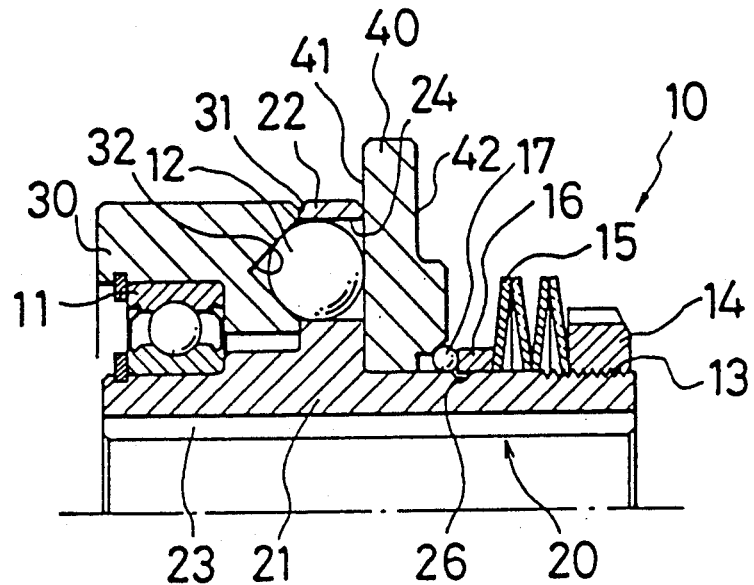
FIG. 1a is an axial section of an overload clutch according to the first embodiment in the torque transmitting condition.
Figure 1B:
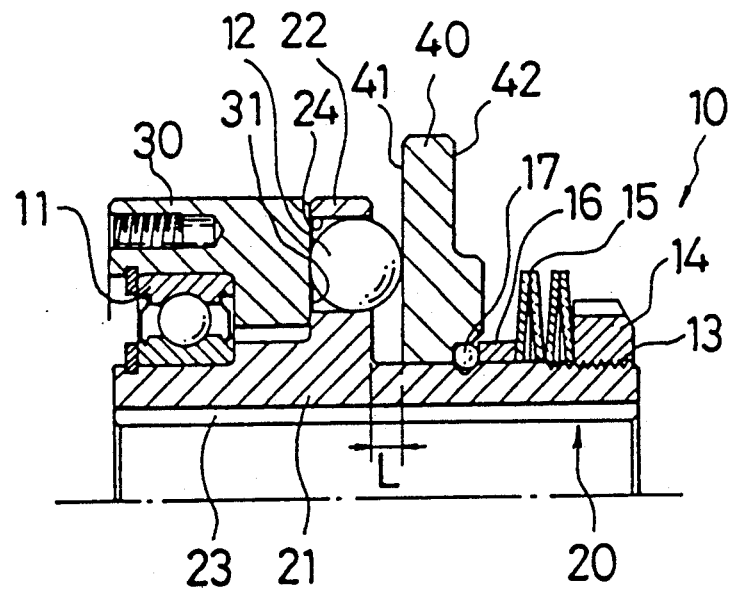
FIG. 1b is an axial section of the overload clutch of FIG. 1a in the torque transmission shut-off condition.

As shown in FIGS. 1a and 1b, an overload clutch 10 according to the first embodiment of the present invention comprises a hub (driving member) 20 and a driven plate (driven member) 30. The driven plate 30 is rotatably supported on the hub 20 by means of a bearing 11.

The hub 20 is formed with a collar portion 22 at the central portion of the cylindrical portion 21 and a groove for a key is formed so as to integrally rotate with a shaft (not shown). A plurality of hollow portions 24 for retaining torque transmitting elements are formed in the radial direction in the collar portion 22 at irregular angular intervals. The reason for this iregualr angular arrangement is to limit the torque-transmitting point during one revolution to only one point. Torque transmitting elements 12 are held within said hollow portions 24.

On the right side 31 of the driven plate 30 opposing the collar portion 22, conical recesses 32 in which the torque transmitting elements 12 are held are formed so as to face the hollow portions 24 at the same angular positions. The portions between recesses 32 are flat.

A pressure plate (pressure member) 40 is rotatably fitted at the right-hand side of the collar portion 22 on the cylindrical part 21 of the hub 20. A thread 13 is formed at the right-hand end of the hub 20 so as to receive an adjusting nut 14. Between the adjusting nut 14 and the pressure plate 40 there are provided a plurality of Belleville springs 15, an annular ring (ring member) 16 and a plurality of balls 17; and the adjusting nut 14 functions to adjust the urging force of the pressure plate 40 imparted to the torque transmitting elements 12. The left-hand side of the pressure plate 40 is flat so as to abut the torque transmitting elements 12.

Figure 2A:
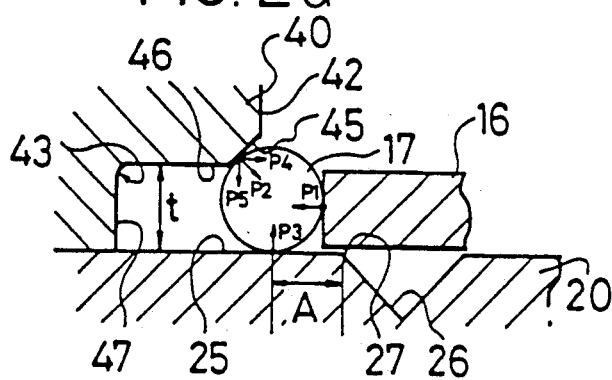
FIGS. 2a to 2d are enlarged axial sections for illustrating the transition from a torque-transmitting condition to a torque transmission shut-off condition.

As shown in FIG. 2a, the right-hand side 42 of the pressure plate 40 is formed with an annular, stepped portion 43 so as to have a clearance t relative to the outer, cylindrical portion 25 of the hub 20. A tapered surface 45 is formed at the opening of said annualr, stepped portion 43.

The ring 16 is cylindrical and its axial end surfaces are perpendicular relative to the shaft. The right-hand side thereof is adapted to receive the urging force of the springs 15 and the left-hand side thereof is adapted to positively urge the balls 17 in the axial direction. The internal diameter of the ring 16 is adapted to allow sliding movement of the ring 16 along the outer cylindrical surface 25 of the hub 20.

The diameter d (see FIG. 2b) of the ball 17 is greater than the distance t between the outer cylindrical surface 25 and the inner surface of the annular stepped portion 43 and the ball 17 is held by the three surfaces, namely, the outer cylindrical surface 25 of he hub 20, the tapered surface 45 of the pressure plate 40 and the left side face of the ring 16. The three forces, namely, the axial force P1 imparted by the spring 15, the reaction force P2 given by the tapered surface 45 of the pressure plate 40 and the reaction force P3 from the outer surface 25 of the hub 20 act on the ball 17 in equilibrium. The component forces P4 and P5 are axial and radial component forces of the reaction force P2, respectively; and consequently.

$$P1 = P4 \text{ and } P3 = P5$$

Figure 10A:
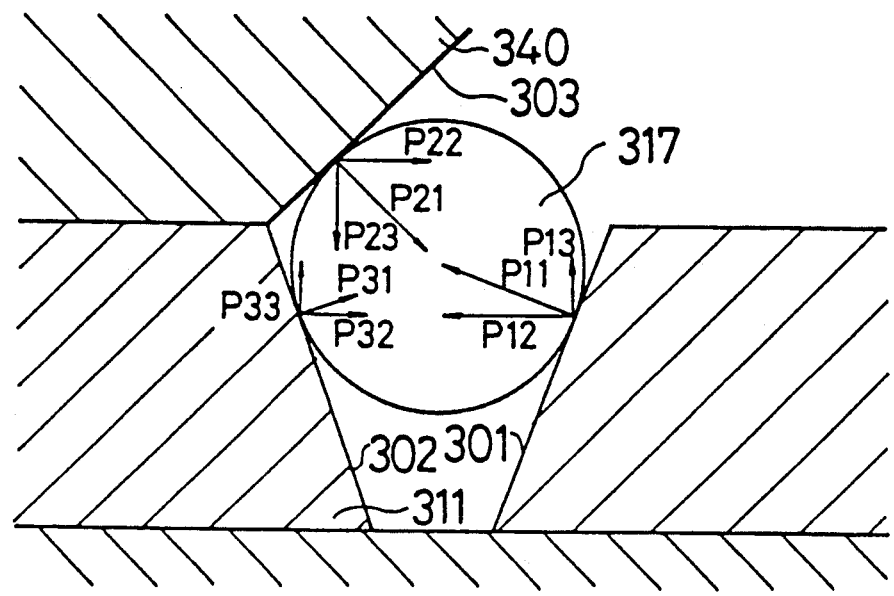
FIG. 10a is an enlarged view of FIG. 9 in the torque transmitting condition.
Figure 10B:
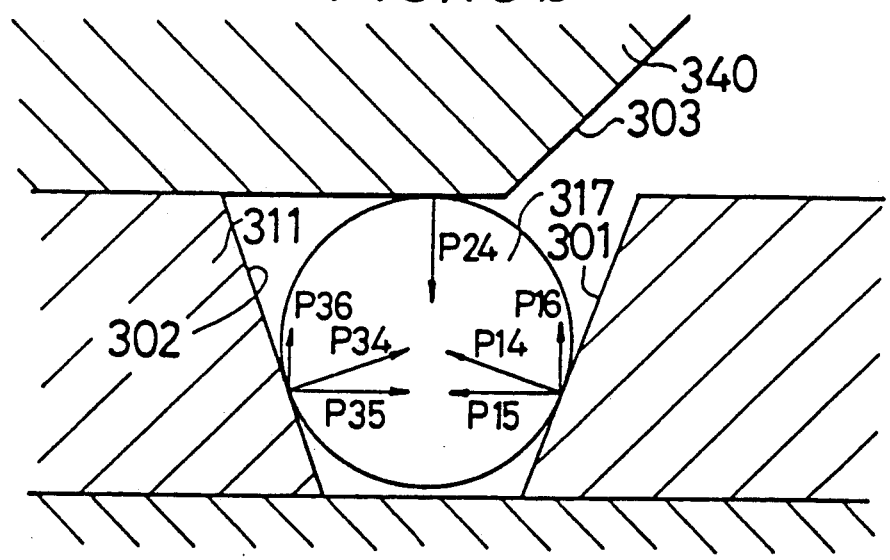
FIG. 10b is an axial section of the overload clutch of FIG. 9 in the torque transmission shut-off condition.

Thus, all the force generated by the spring 15 may be used so as to urge the torque transmitting elements 12 toward the recesses 32. Comparing with FIG. 10a, it will be understood that in case of the prior art, all the urging force generated by the spring is not usable due to the use of a plurality of tapered surfaces, whereas, according to the present invention, 100% of the force of the spring acts on the torque transmitting elements. This is enabled by the arrangement that the ball 17 is in contact with the outer cylindrical surface 25 of the hub 20. As a result, a smaller sized spring may be employed.

An annular groove 26 of V-section is formed on the outer cylindrical surface 25 of the hub 20. The commencing point 27 of the annular groove 26 is located at the point which is separated by the distance A from the contact point of the ball 17 with the outer cylindrical surface 25 toward the spring 15. The distance A is smaller than the amount of movement L (see FIG. 1b) of the torque transmitting elements 12 such that the ball 17 reaches the point 27 of the groove 26 before the torque transmitting elements 12 escape from the recesses 32 completely.

Figure 2B:
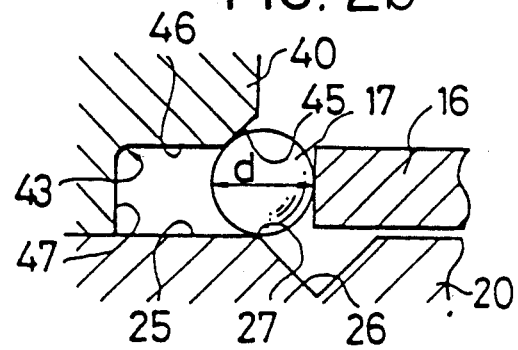

When an overload is encountered in the driven part, the torque transmitting elements 12 are caused to escape from the recesses 32. As the torque transmitting elements 12 urges the pressure plate 40 in opposition to the force of the spring 15, the ball 17 nears the annular groove 26. Since the distance A to the groove 26 is smaller than L as mentioned before, the ball 17 arrives at the commencing point 27 of the annular groove 26 before the torque transmitting elements 12 completely evacuate from the recesses 32 as shown in FIG. 2b. This action is assured by the relation $$P4 > P1$$

Figure 2C:
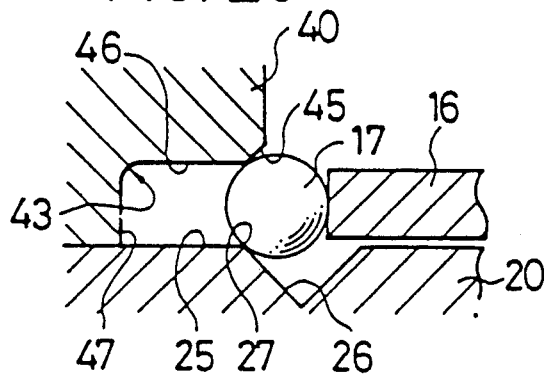

FIG. 2c illustrates the condition immediately after the amounts of movements of the torque transmitting elements 12 and the pressure plate 40 have exceeded the amount A. Assuming that the inclination of the tapered surface 45 of the pressure plate 40 is 45 degrees, $$P5 > 0$$

and accordingly, a force tending to cause the ball 17 to drop into the groove 26 acts on the ball 17. Thus, the ball 17 falls into the groove 26 as soon as the amount of movement of the torque transmitting elements 12 has exceeded the amount A.

Figure 2D:
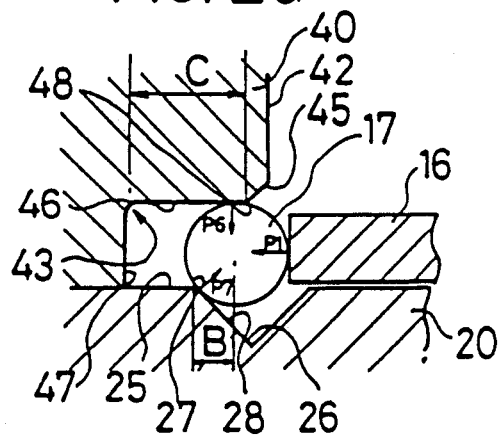

In the next place, FIG. 2d shows the condition in which the ball 17 has fallen into the groove 26 and has been driven out of the axial moving path of the pressure plate 40. The ball 17 is situated at the point which is forward by the amount B and is downward by the amount d−t. At this moment, the ball 17 makes a three-point contact, namely, with the left side surface of the ring 16, the inner surface 46 of the stepped portion 43 of the pressure plate 40 and the surface 28 of the groove 26; and the urging force of the spring 15 will no longer act to urge the pressure plate 40 in the axial direction.

That is, the spring force P1, the reaction force P6 of the inner surface 46 and the reaction force P7 of the groove 26 are in equilibrium; and thus, the spring force P1 is neutralized by the axial component force of the reaction force P7. Consequently, as soon as the ball 17 falls into the groove 26, the pressure plate 40 will be no longer subject to the axial urging force of the spring 15. Incidentally, FIG. 1b shows the condition in which the torque transmitting elements 12 and the pressure plate 40 have moved by the abovementioned distance L; and the torque transmission has been shut off.

Here, the values of A, B and L are determined so that the following equation is satisfied:

$$A + B \leq L$$

The reason for the above requirement is that if A+B exceeds L, the ball 17 will not have completely been driven away from the moving path of the pressure plate 40 when the torque transmitting elements 12 have completely evacuated from the recesses 32, and consequently, when the cause of overload has been removed, the urging force of the spring 15 will act upon the pressure plate 40 and the torque transmitting elements 12 will automatically be restored to the recesses 32. Moreover, so that the ball 17 will not abut against the bottom 47 of the stepped portion 43 when the ball 17 has move the distance B, the depth C of the stepped portion 43 is set as follows:

$$C > d/2$$

Furthermore, if A+B=L, the ball 17 is located at the position with possible interference with the edge 48 of the tapered surface 45, preferably the following relationship should be satisfied in order to assure the condition of the torque transmission shutoff:

$$A + B < L$$

In this case, since the depth C of the stepped portion 43 must be large enough so as to accommodate the ball 17, the value C should be set as large as possible provided that it will not adversly affect the strength of the pressure plate 40.

As mentioned before, the shut-off of the torque transmission when overload is encountered in the driven part takes place just when the ball 17, after rolling on the outer cylindrical surface 25 of the hub 20, arrives at the starting point 27 of the groove 26. The urging force of the spring 15 given to the torque transmission elements 12 may theoreticaly be transmitted 100%. The value of A may be set accurately with ease since the length is straight. Moreover, since there is no loss to the urging force of the spring 15 in contrast to the prior art in which such a loss is inevitable due to existence of a plurality of tapered surfaces, a smaller sized overload clutch of lighter weight may be obtained.

In order to restore the overload clutch to a torque transmitting condition, phase matching of the torque transmitting elements 12 and the recesses 32 is first effected and the pressure plate 40 is moved leftward in FIG. 1a. Since the ball 17 is subject to a radially outwardly directed component force from the surface 28 of the groove 26 due to the urging force of the spring 15, the ball 17 will automatically escape from the groove 26. Thus, the ball 17 will again abut against the tapered surface 45 of the pressure plate 40 and torque may be transmitted again.

Figure 3A:
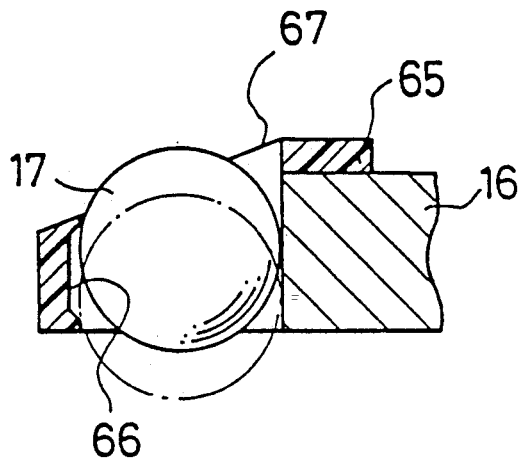
FIGS. 3a and 3b are section of a ring and a ball retainter; and a plan view thereof, respectively.
Figure 3B:
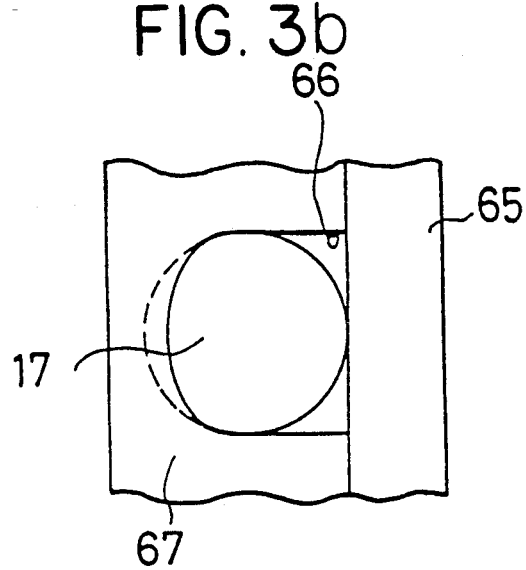

In the next place, FIGS. 3a and 3b show a ball retaining member 65. The ball retaining member 65 is made of plastics and has a plurality of radial through holes 66. The holes 66 are reduced in size at the inner and outer ends thereof so that the ball 17 may be retained while allowing the ball to move radially. The outer surface 67 is inclined so as to avoid interference with the pressure plate 40.

Figure 4A:
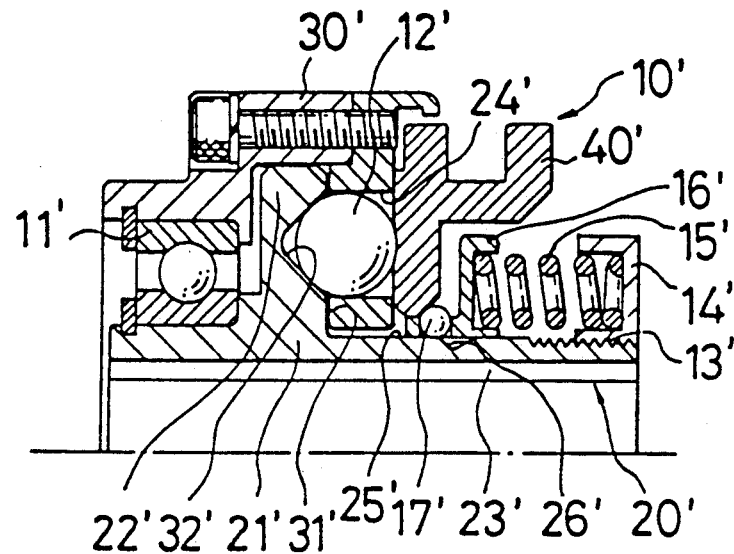
FIG. 4a is an axial section of an overload clutch according to a second embodiment in the torque transmitting condition.
Figure 4B:
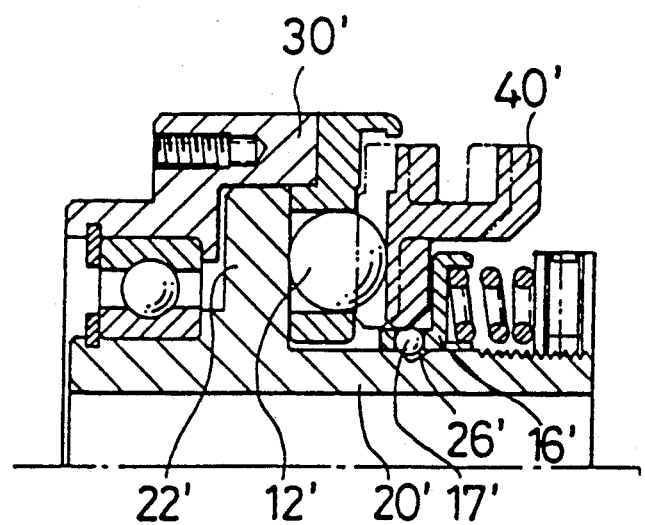
FIG. 4b is an axial section of the overload clutch of FIG. 4a in the torque transmission shut-off condition.

Next, FIGS. 4a and 4b illustrate a second embodiment of this invention. The overload clutch 10' comprises a hub 20' and a driven plate 30'. The driven plate 30' is rotatably supported on the hub 20' by means of a bearing 11'.

A collar 22' is formed at the central portion of the cylindrical portion 21' of the hub 20' and a key groove 23' is formed to the cylindrical portion 21' so as to enable integral rotation with a shaft (not shown). Conical recesses 32' are formed in the collar 22' at irregular intervals. The reason for this irregualr angular arrangement is to limit the torque-transmitting point during one revolution to only one point. The driven plate 30' is disposed at the right side 31' of the collar 22' and hollow portions for holding the torque transmitting elements 12' are formed at irregular angular positions so as to correspondingly oppose the recesses 32'. The portions connecting the adjacent recesses 32' on the collar 31' are flat.

The pressure plate 40' is arranged such that it sandwiches the driven plate 30' with the collar 22'. An outer thread 13' is formed at the right end of the hub 20' so as to receive and adjusting nut 14'. Between the adjusting nut 14' and the pressure plate 40', there are provided a plurality of coil springs 15', an annular ring 16' and a plurality of balls 17'; and the adjusting nut 14' functions to adjust the urging force of the pressure plate 40' imparted to the torque transmitting elements 12'. The left-hand side of the pressure plate 40' is flat so as to abut the torque transmitting elements 12'.

Figure 5:
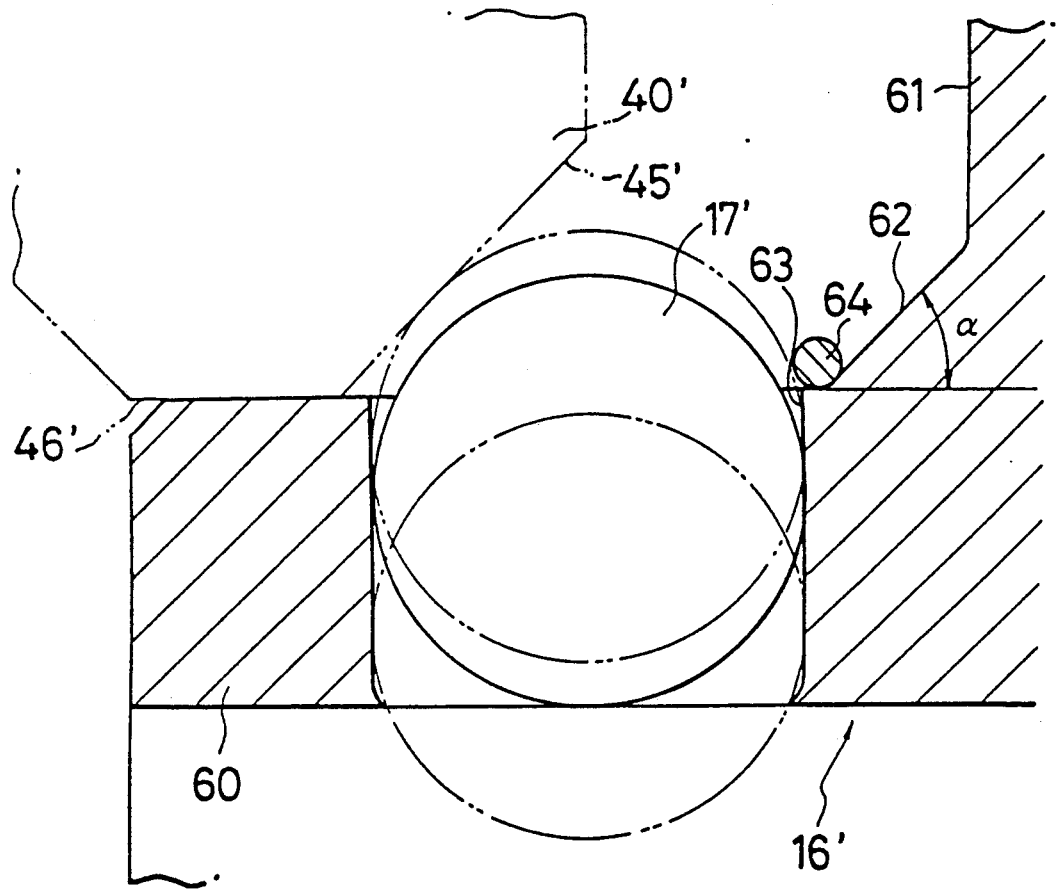
FIG. 5 is a section of a ring having a ball retainer.

The ring 16' according to this embodiment, as shown in FIG. 5, functions not only to transmit the urging force of the springs 15' but to retain the ball 17'. It comprises a cylindrical portion 60 which is adapted to slide on the outer cylindrical surface 25' of the hub 20' and an enlarged portion 61 which is integral with the cylindrical portion 60. A tapered surface 62 is formed between those two portions.

The cylindrical portion 60 has a plurality of radial through holes 63 whose internal diameter is sightly greater than the diameter of the ball 17'. The inner end of the hole 63 is reduced in size so as to prevent the ball 17' from escaping radially and inwardly. An annular retainer ring 64' is provided at the outer end of the hole 63 to prevent the ball 17' from escaping radially and outwardly. The retainer ring 64' is made of expandable material so that the ball 17' may be easily inserted into the hole 63. The above-mentioned ball-retaining structure ensures that the ball 17' may be positively urged axially while freely movable radially.

The right side face of the ring 16' forms a seat of the spring 15' opposing the adjusting nut 14'.

The inner peripheral surface 46' of the pressure plate 40' is slidable on the outer peripheral surface of the ring 16' and is adapted to be guided axially therealong. A tapered surface 45' is formed on the inner side of the pressure plate 40' facing the spring 15'. The diameter d of the ball 17' is greater than the thickness of the cylindrical portion 60, which is almost equal to the distance from the outer cylindrical surface of the hub 20' to the inner peripheral surface of the pressure plate 40'. In the assembled state, the ball 17' is supported at the three point, namely, by the tapered surface 45', the outer cylindrical surface 25' of the hub 20' and the inner surface of the hole 63.

The spring force acting on the torque transmitting elements 12' may be imparted by the pressure plate 40' which is urged by the ring 16' and the ball 17'.

In this embodiment, unlike the first embodiment, the recesses 32' are formed on the hub 20' while the hollow portions 24' for holding the torque transmitting elements 12' are formed in the driven plate 30'; however, the function as an overload clutch for shutting off transmission of excessive torque is the same. In other respects, the difference resides in that instead of providing an annular stepped portion, the internal diameter of the pressure plate 40' is made larger such that the inner peripheral surface 46' thereof may receive the radial component force imparted to the ball 17' by the groove 26'.

FIG. 4b illustrate the condition in which the ball 17' has fallen into the groove 26'. A detailed description of the operation will not be necessary, since it is basically the same as in the first embodiment.

Figure 6A:
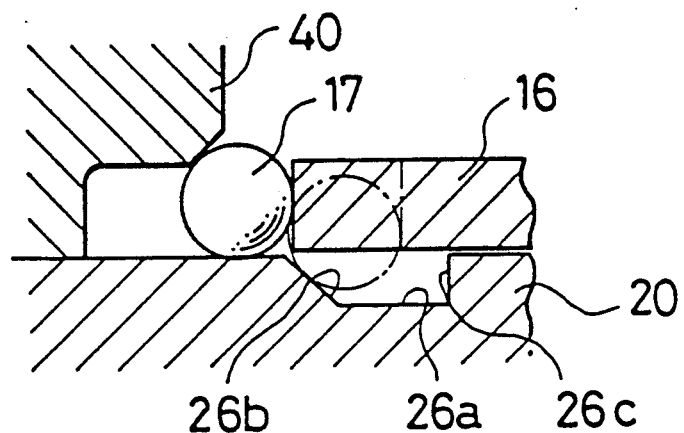
FIGS. 6a and 6b are sections of modified grooves.
Figure 6B:
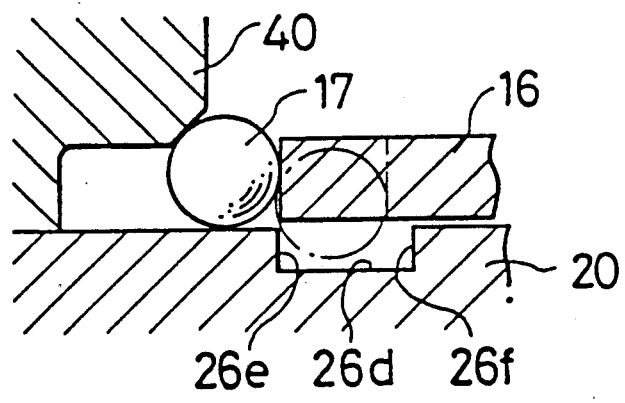
Figure 8:
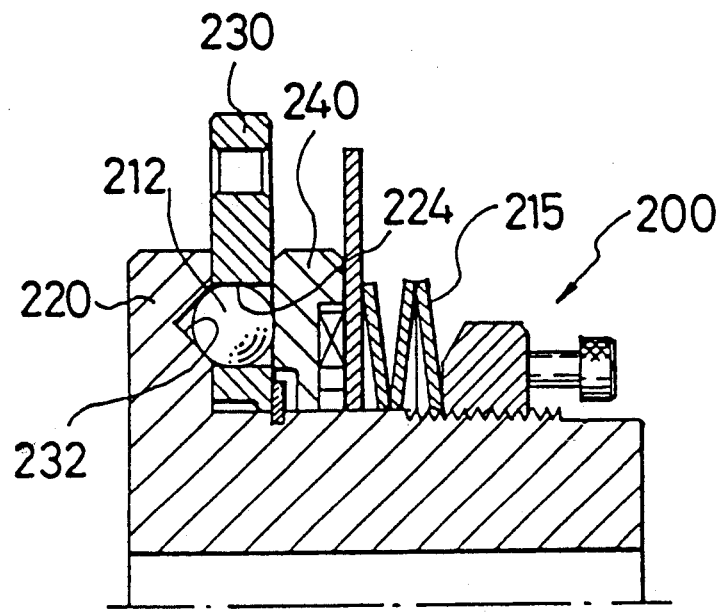
FIGS. 8 and 9 are axial sections of conventional overload clutches.
Figure 9:
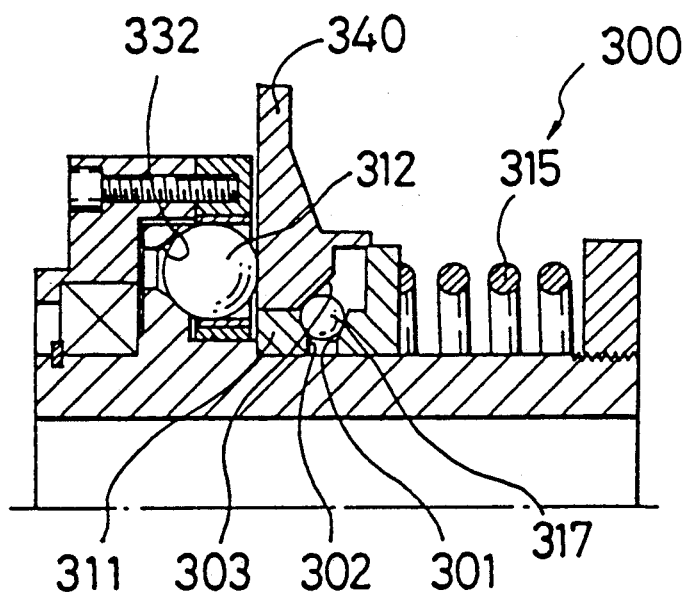

It is to be noted that V-shaped grooves 26, 26' are only illustrative and can be in diverse forms. The function of the groove is firstly to accommodate the ball when an overload is encountered; and secondly to allow the ball to escape therefrom when the pressure plate is restored so as to resume the torque-transmitting operation. From the former viewpoint, the groove can simply be a channel; and from the latter viewpoint, the configuration of the groove must be such that the axial urging force of the spring may be turned into a radially, outwardly directed force. FIGS. 6a and 6b depict two examples of such grooves satisfying those conditions.

The groove 26a in FIG. 6a has two opposing faces; one is a tapered surface 26b and the other is a face 26c perpendicular to the axis.

On the other hand, the groove 26d in FIG. 6b has two opposing faces 26e and 26f which are both perpendicular to the axis. The depth of this groove 26d is smaller than the radius of the ball 17. Therefore, the ball 17 may escape from the groove 26d due to the axial urging force of the spring.

Figure 7:
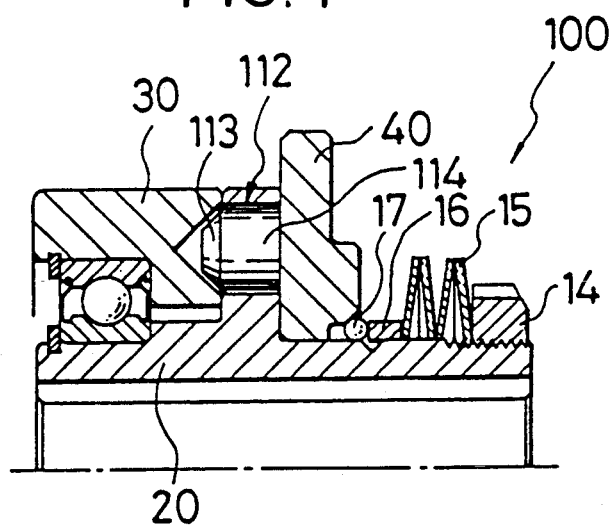
FIG. 7 is an axial section of another embodiment of this invention.

In the next place, FIG. 7 illustrates an overload clutch 100 employing a modified torque transmitting element 112, which has a shape of a plunger. The element 112 has a conical end portion 113 which can be received in the corresponding recess 132 and has a cylindrical body 114. When an overload is encountered, the end portion 113 of the torque transmitting element 112 will be pushed axially outwardly, which in turn will push the pressure plate 40 rightwardly. In other respects, the FIG. 7 embodiment is substantially the same as the FIG. 1 embodiment, and accordingly, a more detailed description will not be required.

It will now be apparent that according to the above described present invention, control of the tripping torque may be effected with ease; the number of parts may be reduced; manufacturing cost may be reduced because of ease of manufacturing; and maintenance may be facilitated when a retainer is employed.

What is claimed is:

1. In an overload clutch in which torque transmitting elements are held within hollow portions formed in one of a driving member or a driven member and are urged by a pressure member through a spring against recesses formed in the other of the driving member or driven member so that torque may be transmitted, and the torque transmitting elements are adapted to escape from said recesses in opposition to an urging force when an overload is encountered, comprising the improvement wherein said pressure member is formed with a tapered surface so that a ball may be held by said tapered surface, the outer axially parallel surface of said driving member and the end surface of a ring member axially urged by said spring while torque is transmitted, and wherein an annular groove is formed on the outer surface of said driving member such that said ball falls into said groove from said surface of said driving member when torque transmission is shut off due to an overload such that said urging force will not act on said pressure member.

2. The overload clutch according to claim 1 in which said annular groove includes a tapered surface in the side of said pressure member.

3. The overload clutch according to claim 1 in which said ring member includes a ball retaining member.

4. The overload clutch according to claim 2 in which said ring member includes a ball retaining member.

5. In an overload clutch in which torque transmitting elements are held within hollow portions formed in one of a driving member or a driven member and are urged by a pressure member through a spring against recesses formed in the other of the driving member or driven member so that torque may be transmitted, and the torque transmitting elements are adapted to escape from said recesses in opposition to an urging force when an overload is encountered, comprising the improvement wherein said pressure member is formed with a tapered surface so that a ball may be held by said tapered surface, the outer surface of said driving member and the end surface of a ring member axially urged by said spring while torque is transmitted, wherein an annular groove is formed on the outer surface of said driving member such that said ball falls into said groove when torque transmission is shut off due to an overload such that said urging force will not act on said pressure member, and wherein said ring member includes a ball retaining member.

6. An overload clutch according to claim 5 in which said annular groove includes a tapered surface in the side of said pressure member.

* * * * *